United States Patent [19]

Ukawa et al.

[11] Patent Number: 5,433,936
[45] Date of Patent: Jul. 18, 1995

[54] FLUE GAS DESULFURIZATION PROCESS

[75] Inventors: Naohiko Ukawa; Toru Takashina; Tsumoru Nakamura, all of Hiroshima; Shinichiro Kotake, Tokyo, all of Japan

[73] Assignee: Mitsubishi Jukogyo Kabushiki Kaisha, Tokyo, Japan

[21] Appl. No.: 29,430

[22] Filed: Mar. 9, 1993

[30] Foreign Application Priority Data

Mar. 11, 1992 [JP] Japan .................... 4-052202

[51] Int. Cl.$^6$ .................................... B01D 53/50
[52] U.S. Cl. .................. 423/243.01; 423/243.04; 423/243.08; 423/243.1; 423/242.3
[58] Field of Search .......... 423/242.3, 243.1, 244.01, 423/244.07, 244.08, 243.01, 243.04

[56] References Cited

U.S. PATENT DOCUMENTS

| | | | |
|---|---|---|---|
| 4,203,954 | 5/1980 | Asanagi | 423/242.3 |
| 4,629,545 | 12/1986 | Mani et al. | 423/244.08 |
| 4,802,966 | 2/1989 | Aoki et al. | 204/182.4 |
| 4,891,195 | 1/1990 | Lin | 423/243 |

FOREIGN PATENT DOCUMENTS

| | | |
|---|---|---|
| 0405619 | 1/1991 | European Pat. Off. |
| 3135623 | 6/1983 | Germany . |
| 3713143 | 10/1987 | Germany . |
| 55-5968 | 2/1980 | Japan ............... 423/243.1 |
| 61-8115 | 1/1986 | Japan . |
| WO85/03238 | 8/1985 | WIPO . |

Primary Examiner—John Zimmerman
Assistant Examiner—Timothy C. Vanoy
Attorney, Agent, or Firm—Jacobson, Price, Holman & Stern

[57] ABSTRACT

A flue gas desulfurization process which comprises the steps of absorbing and separating sulfur oxides from a combustion waste gas using a Ca compound and, as an absorption auxiliary agent, an organic acid which has carboxyl groups at opposite ends of a straight-chain hydrocarbon containing from 1 to 4 carbon atoms in a flue gas desulfurization apparatus, separating the waste water discharged from the desulfurization apparatus in an electrodialyzer which comprises an alternate array of univalent selective anion-exchange membranes and cation-exchange membranes into two solutions: a concentrated solution in which metallic and chlorine ions are concentrated and a dilute solution in which the metallic and chlorine ions are diluted and the organic acid is left behind, and then recycling the dilute solution as an absorbent to the flue gas desulfurization apparatus.

9 Claims, 2 Drawing Sheets

FLUE GAS DESULFURIZATION PROCESS

BACKGROUND OF THE INVENTION

1. Field of the Invention

The present invention relates to a flue gas desulfurization process wherein sulfur oxides are separated by absorption from combustion waste gases.

2. Description of the Related Art

A number of flue gas desulfurization processes using a calcium compound as an absorbent, as typified by the wet lime process, have already been used in practice. For example, the wet lime-gypsum process used in many large-scale flue gas desulfurization systems for commercial power plants involves gas-liquid contact between flue gas containing sulfur oxides and an absorbent solution containing a Ca compound so as to remove the sulfur oxides by absorption and recover gypsum, also referred to as plaster as a by-product.

In the art Of flue gas desulfurization using a Ca compound as an absorbent, it is known that the addition of a water-soluble organic carboxylic acid together with the Ca compound improves the performance of the absorbent for the removal of sulfur oxides (hereinafter called the "desulfurization efficiency"). For instance, the specification of Japanese Patent Provisional Publication (KOKAI) No. 61-8115 reveals that adipic acid, which is an organic carboxylic acid, was found to enhance the desulfurization efficiency when added to the absorbent solution in a flue gas desulfurization apparatus. The enhancement of the desulfurization efficiency by an organic carboxylic acid, e.g., adipic acid, is presumably attributed to the mechanism which will be described in the following. Adipic acid in the absorbent solution is maintained in an equilibrium state as represented by the formulas (1) and (2). It incorporates hydrogen ions [H+] that result from the absorption of sulfur oxides, and attains a kind of buffer effect to prevent a pH drop, thus leading to an improvement in desulfurization efficiency.

$$HOOC(CH_2)_4COOH = HOOC(CH_2)_4COO^- + H^+ \quad \text{(equilibrium)} \quad (1)$$

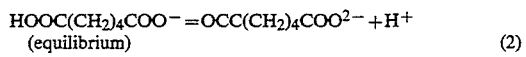

$$HOOC(CH_2)_4COO^- = OCC(CH_2)_4COO^{2-} + H^+ \quad \text{(equilibrium)} \quad (2)$$

On the other hand, the conventional flue gas desulfurization processes require a portion of the absorbent solution to be drawn out as waste water for such purposes as preventing the accumulation of impurities in the solution. While an organic carboxylic acid improves the desulfurization efficiency as noted above, it is soluble in water and therefore becomes entrained by the waste water. The waste water with the organic carboxylic acid entrained causes the following problems.

(1) As the Japanese Patent KOKAI No. 61-8115 points out, waste water containing an organic carboxylic acid may not be released into environment as it is. In such a case the organic carboxylic acid must be decomposed before disposal, and use becomes necessary of costly equipment such as one for the activated sludge processing.

(2) The organic carboxylic acid entrained by waste water is difficult to recover and becomes lost. Therefore, a fresh supply has to be added to the system in an amount equivalent to the loss. Since organic carboxylic acids are generally expensive, the replenishment can become a major economic burden.

(3) To the problems (1) and (2) above, the Japanese Patent KOKAI No. 61-8115 proposes a process wherein waste water (which is called "mother liquor" in this publication) is evaporated to dryness for the recovery of the organic carboxylic acid. The process concurrently recovers water-soluble salts (calcium chloride, magnesium chloride, etc.) that are principal components of waste water. If the organic carboxylic acid is to be reused, it must be separated from the recovered matter and purified before reuse. Although this publication is silent on how to do it, the separation and purification is considered to be very difficult because both water-soluble salts and organic carboxylic acids are soluble in water.

SUMMARY OF THE INVENTION

In view of the state of the art outlined above, an object of the present invention is to provide a flue gas desulfurization process capable of overcoming the problems of the conventional art.

The present invention provides a flue gas desulfurization process comprising the steps of absorbing and separating sulfur oxides present in a combustion exhaust gas using a calcium compound and, as an absorption auxiliary agent, an organic acid which has a straight-chain hydrocarbon made up of 1 to 4 carbon atoms and carboxyl groups at opposite ends of said hydrocarbon, in a flue gas desulfurization apparatus; separating waste water discharged from said flue gas desulfurization apparatus into two solutions: a concentrated solution containing concentrated metal and chlorine ions and a dilute solution containing diluted metal and chlorine ions as well as said organic acid left behind, with use of an electrodialyzer in which a univalent-selective anion-exchange membrane and a cation-exchange membrane are disposed in a alternating manner; and conducting said dilute solution to said flue desulfurization apparatus to be used as an absorbent.

The present invention is based upon the discovery that when waste water discharged from a flue gas desulfurization apparatus and containing an expensive organic carboxylic acid is concentrated by an electrodialyzer, calcium ions $Ca^{2+}$ and magnesium ions $Mg^{2+}$ of water-soluble salts (e.g., calcium chloride and magnesium chloride) which are major components of the waste water permeate cation-exchange membranes, and chlorine ions $Cl^-$ permeate univalent-selective anion-exchange membranes and become concentrated; however, the organic carboxylic acid permeates neither of these membranes. Thus, the dilute solution coming out of the electrodialyzer contains both water from which the water-soluble salts have been removed and the organic carboxylic acid. Recycling this solution to the flue gas desulfurization apparatus renders it possible to solve all the foregoing problems without the loss of the organic carboxylic acid.

As detailed in the embodiment described below, the present invention provides a flue gas desulfurization process wherein desulfurization efficiency can be improved without any loss of an organic carboxylic acid.

DETAILED DESCRIPTION OF THE PREFERRED EMBODIMENT

Figure 1:
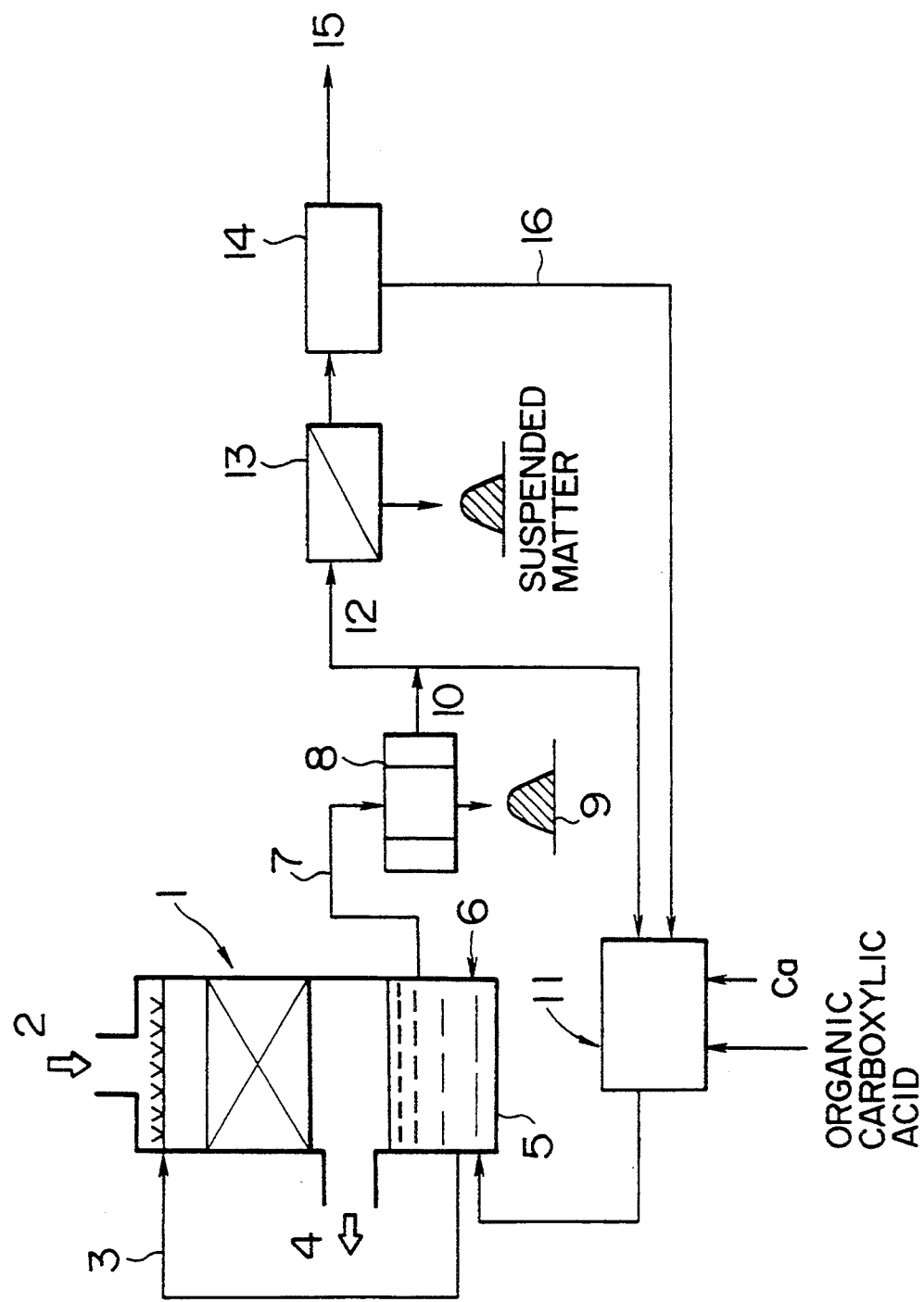
FIG. 1 is a flow diagram of an embodiment of the present invention.

The behavior of the water-soluble salts and the organic carboxylic acid in waste water inside the electrodialyzer will now be explained in connection with a schematic view of FIG. 2. Water-soluble salts in the effluent from an ordinary flue gas desulfurization installation are made up of calcium ions $Ca^{2+}$, magnesium ions $Mg^{2+}$, and chlorine ions $Cl^-$. An organic carboxylic acid joins the ions in accordance with the present invention. The $Ca^{2+}$, $Mg^{2+}$, and $Cl^-$ ions migrate in an electric field formed between positive and negative electrodes. The cation-exchange membranes C and univalent-selective anion-exchange membranes A arranged alternately between the two electrodes selectively stop and let these ions pass through, and the ions are eventually taken out of the electrodialyzer in the form of concentrated and dilute solutions. That is, the $Ca^{2+}$ and $Mg^{2+}$ ions migrate toward the negative electrode. They pass through a cation-exchange membrane C into a concentrating liquid compartment and try to migrate farther toward the negative electrode. However, they are stopped by the univalent-selective anion-exchange membrane A and remain in the concentrating compartment. The $Cl^-$ ions migrate in an opposite direction toward the positive electrode, pass through the univalent selective anion-exchange membrane A into the concentrating chamber, and attempt to move farther toward the positive electrode, but are kept by a cation-exchange membrane C to remain in the concentrating chamber. $Cl^-$ ions become combined there with positive $Ca^{2+}$ and $Mg^{2+}$ ions that have migrated from the opposite direction and are jointly carried by a concentrated solution which is a moving medium away from the electrodialysis compartment.

In the meantime the organic carboxylic acid is dissociated as indicated by the reaction formulas (1) and (2). The hydrogen ion concentration and other properties of the waste water being treated suggest that the organic carboxylic acid is substantially in the form on the right side of the formula (2). The acid now takes the form of a bivalent anion $OOC(CH_2)_4COO^{2-}$ (called a "bivalent organic carboxylate ion" for now and indicated by "CA" in FIG. 2). The organic carboxylic acid, now in the form of anions, tends to move in the same direction as $Cl^-$ ions, but being bivalent ions, the acid is unable to permeate a membrane when it is a univalent-selective anion-exchange membrane A. As a result, the acid becomes left behind in the dilute solution, and recycling this dilute solution to the flue gas desulfurization apparatus makes it possible to concentrate the waste water without a loss of the organic carboxylic acid.

For the above-described reason, univalent-selective anion-exchange membranes that selectively allow univalent anions alone pass through are used as anion-exchange membranes.

An embodiment of the invention will now be described in detail with reference to FIG. 1. In the figure, numeral 1 indicates an absorption column of a flue gas desulfurization apparatus wherein combustion gas 2 comes in contact with an absorbent solution 3 which contains a Ca compound and an organic carboxylic acid, and circulates through the absorption column. The gas-liquid contact causes sulfur oxides in the combustion gas to be separated by absorption from it. The combustion gas stripped of the sulfur oxides now leaves the system as clean gas 4. The sulfur oxides absorbed by the absorbent solution 3 react with calcium ions $Ca^{2+}$ in the Ca compound as in formula (3) below and then become oxidized with oxygen in the combustion gas as in formula (4) to form plaster ($CaSO_4$). If the oxidation in the reaction (4) is insufficient for some reason, such as a too high sulfur oxide concentration or too low oxygen concentration in the combustion gas, air 6 may be injected into a liquid reservoir 5 of the absorption column.

$$Ca^{2+} + SO_2 + H_2O \rightarrow CaSO_3 + 2H^+ \qquad (3)$$

$$CaSO_3 + \tfrac{1}{2}O_2 \rightarrow CaSO_4 \qquad (4)$$

The resulting plaster, low in solubility, precipitates as a solid matter in the absorbent solution. A portion of the plaster-containing solution is drawn out of the absorption column through a withdrawal line 7 into a solid-liquid separator 8. It is separated there into two: plaster 9 and filtrate 10, the plaster being subsequently utilized for fabrication into plaster boards or as a cement material. The filtrate is mostly conducted to a preparation tank 11, where a Ca compound and an organic carboxylic acid are added, and the mixture is returned to the absorption column. It is not essential to add the organic carboxylic acid to the preparation tank, and the acid may alternatively be introduced directly into the column. The former procedure is used in the embodiment being described because a device for addition of the acid can be simple.

Part of the filtrate is sent to waste water treatment facilities by way of a waste water line 12. The facilities in this embodiment comprise a suspended-matter eliminator 13 and an electrodialyzer 14. The suspended-matter eliminator 13 is a step provided for the removal of suspended matter when suspended substances abound in the waste water emerging from the waste water line 12. This step may be omitted when the amount of suspended matter present in the waste water is not too large. The eliminator is not an essential component for the present invention.

Figure 2:
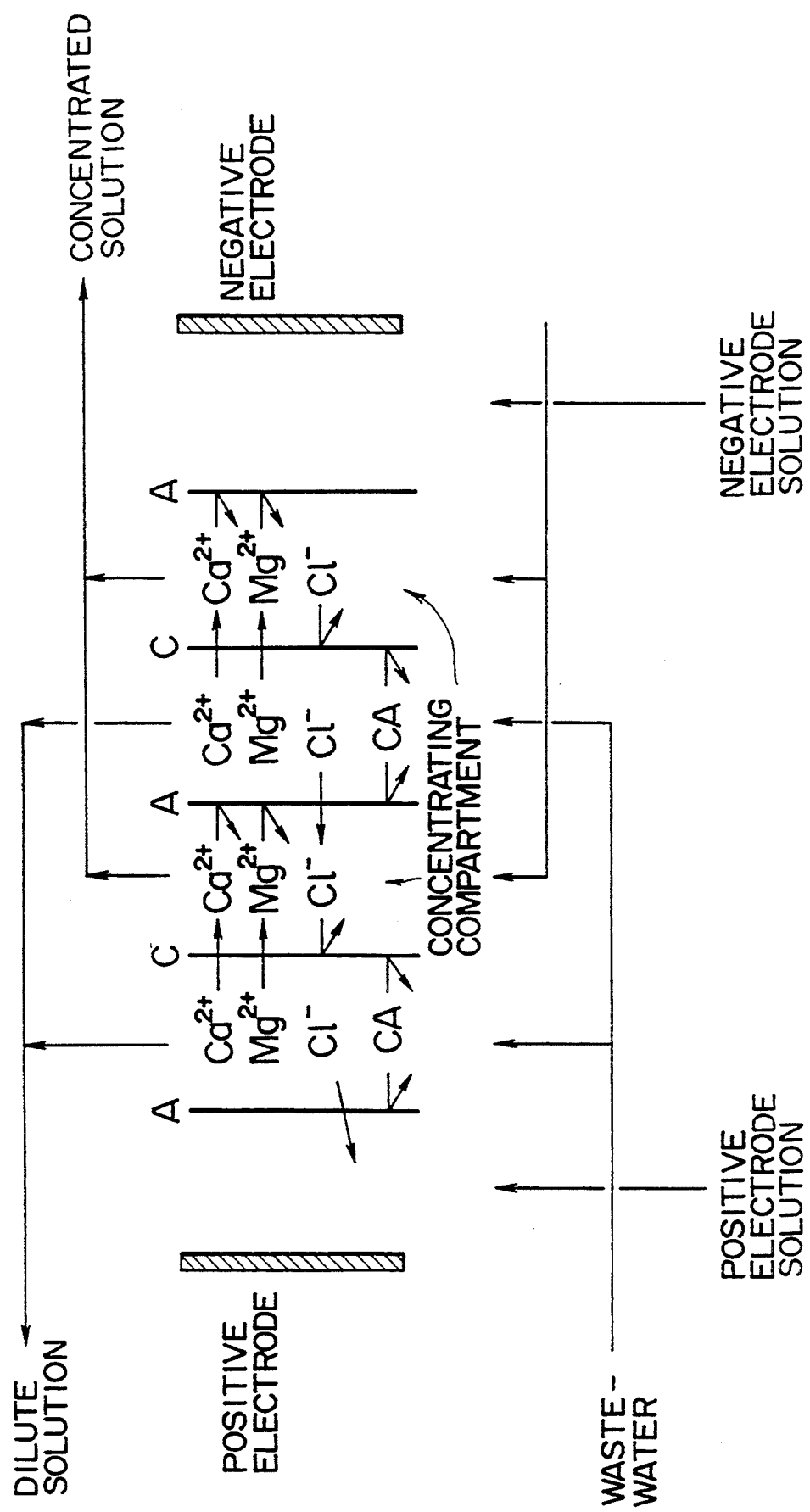
FIG. 2 is a schematic view illustrating the construction of an electrodialyzer according to the invention and the behavior of ions therein.

The waste water treated by the suspended-matter eliminator 13 is then transferred to an electrodialyzer 14, in which substances contained in the water behave in the manner already described in detail in conjunction with FIG. 2.

A concentrated solution 15 that leaves the electrodialyzer 14 is one composed mainly of calcium chloride and magnesium chloride and is discarded as it is. On the other hand, a dilute solution 16 containing the organic carboxylic acid is recycled to the flue gas desulfurization apparatus. Although the dilute solution in the embodiment illustrated is led to the preparation tank 11, it may be directed to the absorption column 1 instead. Whichever route is taken, the effect attainable, in principle, is exactly the same.

The embodiment illustrated in FIG. 1 was operated under the following conditions:

| For the absorption column | |
| --- | --- |
| Inlet gas quantity | 200 m³N(dry)/h |
| Inlet SO₂ concentration | 3050 ppm (dry) |
| Absorbent solution circulatory flow rate | 5.3 m³/h |
| Absorption column liquid reservoir capacity | 0.4 m³ |

| | | | |
|---|---|---|---|
| pH during operation | | 5.2 | |
| Organic carboxylic acid concentration in absorbent solution | | 5.0 mmol/l | |
| Absorbent | | Calcium carbonate | |
| For the electrodialyzer | | | |
| Current density | | 1.5 A/dm² | |
| Temperature | | 40.3° C. | |
| Membrane surface flow rate | | 5.2 cm/sec | |

The results of operation performed as an embodiment of the present invention under the above-specified conditions are given in Table 1. To illustrate merits of the invention, the table also carries the results of operation without the electrodialyzer as a comparative example. The data in Table 1 were obtained by the use of adipic acid as an organic carboxylic acid.

TABLE 1

| Item | Unit | Embodiment | Comparative example |
|---|---|---|---|
| Waste water quantity (line 12 in FIG. 1) | l/h | 3.0 | 3.0 |
| Recovered water quantity (line 16 in FIG. 1) | l/h | 2.65 | 0 |
| Discarded water quantity (line 15 in FIG. 1) | l/h | 0.35 | 3.0 |
| Organic carboxylic acid concentration in discarded water | mmol/l | 0 | 5.1 |
| Calcium chloride concentration in discarded water | mg/l | 76800 | 17800 |
| Magnesium chloride concentration in discarded water | mg/l | 57800 | 13400 |
| Organic carboxylic acid loss | mmole/h | 0 | 15 |

As can be seen from Table 1, the embodiment of the invention substantially reduced the quantity of discarded waste water as compared with the comparative example. Moreover, the discarded water contained no organic carboxylic acid, allowing effective utilization of the acid. The comparative example required the addition of the organic carboxylic acid to the system so as to make up for the loss during operation whereas the embodiment of the invention required no such addition. The organic carboxylic acid, of course, undergoes slight autolysis and called for the replenishment in both working and comparative examples, but the amount of replenishment needed was very small in the embodiment of the invention.

Meanwhile, the effect of the addition of an organic carboxylic acid upon the improvement in desulfurization efficiency was also determined. When the acid was not added, the $SO_2$ concentration at the outlet of the absorption column was 320 ppm (dry), but when operated under the conditions of the present example, the value declined to 150 ppm (dry). Thus an improvement in sulfur removal efficiency too was confirmed.

Test operations under the above conditions of the embodiment were repeated except that the organic carboxylic acid was replaced by malonic, succinic, and glutaric acids. Similar effects were observed. The use of calcium hydroxide in place of carbonate again gave similar results.

As detailed in the embodiment, the present invention provides a flue gas desulfurization process wherein desulfurization efficiency can be improved without any loss of an organic carboxylic acid.

We claim:

1. A flue gas desulfurization process wherein a waste water is treated by the effective recycling of an absorption auxiliary agent back into the process comprising the steps of:

absorbing and separating sulfur oxides present in a combustion exhaust gas using calcium compound and, as the absorption auxiliary agent, an organic acid which has a straight chain hydrocarbon made up of 1 to 4 carbon atoms and carboxyl groups at opposite ends of said hydrocarbon, in a flue gas desulfurization apparatus;

obtaining the waste water from said flue gas desulfurization apparatus to be treated and separating out a solid component;

separating a remaining component of said waste water into two solutions: a concentrated solution containing metal and chlorine ions and a dilute solution containing diluted metal and chlorine ions as well as said organic acid left behind, using an electrodialyzer in which a univalent-selective anion exchange membrane and a cation exchange membrane are disposed in an alternating manner; and recycling said organic acid recovered from said dilute solution to said flue gas desulfurization to be used as the absorbent auxiliary agent; said organic acid being essentially free of metal ion or chloride ion solution.

2. The process as claimed in claim 1, wherein said univalent-selective anion-exchange membrane lets only univalent anions pass through it and does not allow bivalent anions and cations to pass through.

3. The process as claimed in claim 2, wherein said univalent-selective anion-exchange membrane does not let bivalent organic carboxylic acid ions pass but lets chlorine ions pass through.

4. The process as claimed in claim 1, wherein said cation-exchange membrane allows cations to pass through it but does not let anions pass through.

5. The process as claimed in claim 4, wherein said cations which pass through are calcium and magnesium ions.

6. The process as claimed in claim 1, further comprising the steps of conducting a part of filtrate resulting from separating out said solid component to said electrodialyzer; and conducting the remaining part of said filtrate to an absorption column of said desulfurization apparatus.

7. The process as claimed in claim 6, further comprising the step of removing a suspended component present in said filtrate before conducted to said electrodialyzer.

8. The process as claimed in claim 1, wherein the chloride and metal ions are discarded in the concentrated solution as metal chlorides.

9. The process as claimed in claim 1 wherein the solid component is gypsum.

* * * * *